United States Patent [19]

Alexion et al.

[11] Patent Number: 4,688,996
[45] Date of Patent: Aug. 25, 1987

[54] ELECTROMAGNETIC FLOW COUPLER FOR REGULATING FLOW RATE/PRESSURE

[75] Inventors: Christopher C. Alexion, North Versailles Twp., Allegheny County; Richard D. Nathenson, Pittsburgh; Alvin R. Keeton, Union Township, Washington County, all of Pa.

[73] Assignee: Electric Power Research Institute, Palo Alto, Calif.

[21] Appl. No.: 822,183

[22] Filed: Jan. 24, 1986

[51] Int. Cl.$^4$ .............................................. H02K 44/00
[52] U.S. Cl. ......................................... 417/50; 310/11
[58] Field of Search ............................. 417/50; 310/11

[56] References Cited

U.S. PATENT DOCUMENTS

| 2,715,190 | 8/1955 | Brill | 310/11 |
|---|---|---|---|
| 3,280,349 | 10/1966 | Brenner et al. | 310/11 |
| 3,444,816 | 5/1969 | King | 417/50 |
| 3,802,262 | 4/1974 | Banks | 310/11 |
| 3,807,903 | 4/1974 | Gelfgat et al. | 310/11 |
| 4,469,471 | 9/1984 | Keeton et al. | 417/50 |

FOREIGN PATENT DOCUMENTS

| 745460 | 2/1956 | United Kingdom . |
|---|---|---|
| 905940 | 9/1962 | United Kingdom . |

OTHER PUBLICATIONS

Davidson et al., "Sodium Electrotechnology at the Risley Nuclear Power Development Labs", *Nuclear Energy*, Feb. 1981, pp. 79-90.

*Primary Examiner*—Carlton R. Croyle
*Assistant Examiner*—Donald E. Stout

[57] ABSTRACT

A flow characteristic regulating electromagnetic flow coupler is disclosed as comprising a pump duct and a generator duct for connection in separate flow circuits containing electrically conductive fluid. Circuit means electrically connect the separate fluid in each of the pump and generator ducts for conducting electric current through the fluid in each of the pump and generator ducts transversely of the fluid flow therethrough. Means are provided for applying respectively first and second magnetic fields through the fluids of the generator and pump ducts transversely of the current and fluid flow therethrough, whereby the fluid driven through the generator duct forces the fluid to flow through the pump duct. Means are provided for setting the magnetic flux density of the first and second magnetic fields in the generator and pump ducts at different levels B1 and B2 respectively, whereby the flow characteristic of the forced fluid in the pump duct is greater than that flow characteristic of the drive fluid in the generator duct.

25 Claims, 8 Drawing Figures

ELECTROMAGNETIC FLOW COUPLER FOR REGULATING FLOW RATE/PRESSURE

BACKGROUND OF THE INVENTION

1. Field of the Invention

This invention relates to electromagnetic (EM) flow couplers and, in particular, to such couplers as adapted for regulating the flow rate or the pressure of the driven flow of a metal fluid.

2. Description of the Prior Art

As is well known in the art, EM pumps produce a pressure differential or a pressure head between the inlet and the outlet through the interaction of an electrical current and a crossed magnetic field. This interaction produces an electromagnetic body force throughout the volume of the fluid within the pump region wherever both the current density and the magnetic field are non-zero. At each such point, this body force is dependent on not only to the magnitude of the current density and magnetic flux density vectors, but also to their relative orientation. The maximum force density and resulting pressure differential occurs when the current and the magnetic field are mutually perpendicular to each other and to the direction of fluid flow.

There are two basic types of EM pumps. A first type known as an AC (alternating current) pump includes means for applying an alternating magnetic field to the liquid metal. In an AC EM pump, the alternating magnetic field induces a corresponding AC current through the liquid metal, whereby a force is exerted thereon. In a DC EM pump, a steady state electromagnetic field and a steady state or DC current are applied to the liquid metal, whereby a corresponding force is exerted thereon.

Typically, DC EM pumps are constructed in a rectangular duct by mounting two electrodes flush with the opposite side walls of the duct and placing the other two walls between magnetic pole faces. When the two electrodes are connected to an external power supply, current flows across the duct and interacts with the magnetic field to produce the axially directed body force and pressure difference along the duct. The pump's inlet and exit regions are defined roughly by the electrode edges. These regions may vary somewhat depending upon the relative location of the magnetic pole face edges. In an ideal pump, all the current would be confined to the duct volume enclosed by the electrodes and the pole faces, where the force density is the greatest. In an actual pump, however, some current leaks into the magnetic fringe region both upstream and downstream from the electrode edges. This tends to lower pump efficiency.

DC EM pumps, in small sizes up to several horsepower, have been used for many years in liquid metal cooled reactors where extremely high reliability of the pump has been required. Large, several thousand horsepower, DC EM pumps, have not been used in reactor systems in two main reasons: (1) obtaining suitable high current/low voltage power supplies, and (2) transmitting the high current from the power supply to the pump without high resistance loses. Suitable high current/low voltage power supplies may take the form of a Faraday disc generator, which generates high current at relatively low voltages as would be suitable to drive DC EM pumps. However, current transmission problems associated with such current generators require the use of large current buses. To overcome both of these problems, two ducts may be arranged side-by-side in a common magnetic field with one such duct acting as an EM generator and the other acting as an EM pump. This arrangement of EM pumps is commonly referred to as a "flow coupler" and is described in U.S. Pat. No. 2,715,190 of Brill and U.K. patent No. 745,460 of Pulley.

In a typical flow coupler, a liquid metal is caused to flow through a generator duct. Passage of the fluid through the common magnetic field generates a large current in the generator duct which is transferred to a pump duct by short, low resistance electrodes. Interaction of the current in the pump duct with the common magnetic field produces a driven flow in the pump duct. In this manner, the flow of a first liquid metal in the generator duct is "coupled" to the flow of a second liquid metal in the pump duct. The local generation of the current enables lower voltages and higher currents to be used than would be possible with an external power supply. The lower voltages, in turn, reduce end current losses and permit higher overall efficiencies, on the order of 60%, to be attained.

Early in the development of the liquid-metal fast breeder reactor (LMFBR), it was recognized that liquid metals could be pumped by the EM pumps as described above. Such EM pumps and flow couplers offer significant advantages in the reactor environment due to their inherent simplicity and lack of moving parts. In "Sodium Electrotechnology at the Risley Nuclear Power Development Laboratories," by D. F. Davidson et al., NUCLEAR ENERGY, 1981, Vol. 20, February, No. 1, pp. 79-90, there is discussed the use of EM pumps and flow couplers in LMFBR systems. EM flow couplers serve to transfer hydraulic power from one liquid metal flow circuit to another. Each circuit is isolated from the other so that there is no mixing of the two liquid metals.

The flow coupler illustratively includes the pump duct and the generator duct of equal sizes, one duct coupled in each circuit and disposed side-by-side with each other between the poles of a permanent magnet. The pump and generator ducts are electrically connected together by the low resistance electrodes so that a current induced by flow in one duct passes through the other duct to produce a driving pressure. The side-by-side arrangement of the two ducts are disposed between two magnetic poles, whereby an equal magnetic flux emanates through each duct. For equally sized ducts in equal magnetic fields, it has been found to be impossible to make the flow rate of the flow directed through the pump duct greater than that of the flow through the generator duct. Such a limitation is seen as a disadvantage for those reactor designs that require higher flow rates in the pump duct than in the generator duct.

The Pulley patent, noted above, discloses a flow coupler, wherein a pressure transformation between two ducts, in inverse ratio to the duct depths may be achieved. In this arrangement, the flux density in each of these ducts is maintained equal. Further, Pulley discloses that the flow velocity may be transformed in direct proportion to the duct widths. A low flow rate may be established through a secondary or pump duct of large cross-section to provide, a high flow rate in the pump duct of small cross-section, the pressure drops in the two ducts remaining equal. An examination of the Pulley patent indicates that the magnetic flux in each of the ducts of his coupler remains equal and that flow pressure or flow rate may be changed as a function of the dimensions of the ducts.

SUMMARY OF THE INVENTION

In accordance with the teaching of this invention, there is provided a regulating electromagnetic flow coupler comprising a pump duct and a generator duct for connection in separate flow circuits containing electrically conductive fluid. Circuit means electrically connect the separate fluid in each of the pump and generator ducts for conducting electric current through the fluid in each of the pump and generator ducts transversely of the fluid flow therethrough. Means are provided for applying a magnetic field through the fluid of the pump and generator ducts transversely of the current and fluid flow therethrough, whereby the fluid driven by external means through the generator duct forces the fluid to flow through the pump duct. Means are provided for setting the magnetic flux density in the pump and generator ducts at different levels, B1 and B2 respectively, and the flow characteristics, i.e., flow rate and pressure, of the forced fluid in the pump duct are selectively different than that flow characteristic of the driven fluid in the pump duct.

In one aspect of this invention, the regulating electromagnetic flow coupler is adapted to operate as a pressure amplifier, wherein the ratio $(B_2/B_1)/(t_2/t_1)$ is set sufficiently greater than 1 such that the pressure of the fluid in the pump duct is greater than the pressure of the fluid in the generator duct, where t1 and t2 are the duct heights of the pump and generator ducts.

In a further aspect of this invention, the regulating electromagnetic flow coupler is adapted to operate as a flow rate amplifier, wherein the ratio $(t_2/t_1)/(B_2/B_1)$ is set sufficiently greater than 1 such that the flow rate of the fluid in the pump duct is greater than the flow rate of the fluid in the generator duct.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

Figure 1:
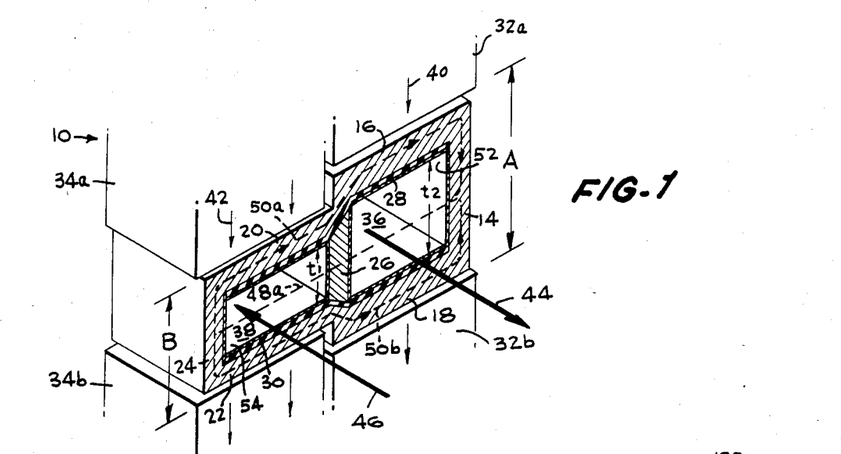
FIG. 1 is a broken away, perspective view of a regulating EM flow coupler in accordance with the teachings of this invention.

Referring now to the drawings and in particular to FIG. 1, there is shown a regulating electromagnetic (EM) flow coupler, which is referred to generally by the number 10 and comprises a pump duct 36 and a generator duct 38 disposed in a side-by-side relationship. The regulating EM flow coupler 10 includes a side wall 14, a top wall 16, and a bottom wall 18 forming in conjunction with an electrically conductive divider plate 26, the pump duct 36. In a similar fashion, the regulating EM flow coupler 10 includes a top wall 20, a bottom wall 22, and a side wall 24 defining in conjunction with the electrically conductive divider plate 26, the generator duct 38. The walls 14, 16, 18, 20, 22 and 24 are made of a highly electrically conductive material such as copper. The electrically conductive divider plate 26 may be made of a copper alloy. The divider plate 26 functions as a circuit means for electrically connecting the pump duct 36 and the generator duct 38, whereby a current is permitted to flow in both ducts transversely of the fluid flow therethrough. Further, layers or sheets 28 and 30 of insulating material are respectively disposed on the top-most and lower-most surfaces of the ducts 36 and 38. Such sheets 28 and 30 may be made of a suitable insulating material such as alumina, where relatively high temperatures are contemplated, or a glass epoxy, where relatively low temperatures are expected. As explained above, a current is generated within the generator duct 38 as directed along a current path 48a as seen in FIG. 1. The side wall 24 acts as an electrode, while the top walls 16 and 20 act as a return conductor to permit current flow along a return current path 50a. In a similar fashion, the bottom walls 18 and 22 act as a return conductor to establish a second return current path 50b. The return current paths 50a and 50b are coupled to the side wall 14, which acts as an electrode to direct the current along the current path 48a through the liquid flowing in the pump duct 36, the divider plate 26 and the liquid flowing in the generator duct 38.

As indicated above, the EM flow coupler 10 may be particularly adapted for use in a liquid-metal fast breeder reactor, wherein reactive liquid metals such as sodium are circulated. In such applications, an inner, protective duct 52 may be disposed within the pump duct 36. Illustratively, the inner, protective duct 52 may be formed of a relatively thin layer in the range of 40 to 60 mil in thickness of a relatively high resistance conductive material such as stainless steel as manufactured under the designations 304 and 316 or Inconel number 718. The inner protective duct 52 is formed on the inner surfaces of the side wall 14, the insulater sheets 28 and 30, and the divider plate 26. A similar inner, protective duct 54 may be disposed within the generator duct 38, as shown in FIG. 1.

A first set of magnetic poles 32a and 32b is aligned such that their axes are disposed vertically, as shown in FIG. 1, so that the magnetic field generated thereby, as indicated by arrows 40, is likewise disposed in a vertical orientation to pass through the pump duct 36. In a similar fashion, there is provided a second set of magnetic poles 34, whose axes are aligned vertically, as shown in FIG. 1, so that their magnetic field is directed vertically, as shown by arrows 42, to pass through the generator duct 38. As is well known in the art, the first and second sets of magnetic poles 32 and 34 may be either permanent magnets or electromagnets. As illustrated in FIG. 1, the air gap formed between the first set of magnetic poles 32a and 32b is indicated by the letter A and is made greater than the air gap between the second set of poles 34a and 34b, whose length is indicated by the letter B. As a result, the strength of the magnetic field B1 established between the second set of poles 34a and 34b is greater than the magnetic field B2 established between the first set of poles 32a and 32b.

This invention is not directed to the details of the construction of the generator duct 38 and the pump duct 36; for a detailed showing of the construction of such an EM flow coupler reference is made to the co-pending application entitled ELECTROMAGNETIC FLOW COUPLER, Ser. No. 391,030, now U.S. Pat. No. 4,469,471 filed in the name of Keeton & Ciarelli on June 22, 1982.

The regulating EM flow coupler 10 of this invention is capable of operating as a flow characteristic amplifier, wherein the flow characteristic may be either the flow rate or the pressure rise of the metal fluid along the duct. In the flow rate amplifier mode of operation, the duct height t2 of the pump duct 36, i.e., that dimension along the direction of the magnetic field as indicated by the arrows 40 in FIG. 1, is made greater in the pump duct 36 than the corresponding dimension t1 in the generator duct 38. Further, the magnetic flux density B1 is made greater in the generator duct 38 than the flux density B2 in the pump duct 36. As shown in FIG. 1, the air gap established between the magnetic poles 32a and 32b is greater than the air gap established between the magnetic poles 34a and 34b, whereby the magnetic field B1 established within the generator duct 38 is greater than the magnetic field B2 established within the pump duct 36.

Other mechanisms could be used to vary the magnetic fields in each of the generator duct 38 and the pump duct 36. For example, it is contemplated that if the first set of magnetic poles 32a and 32b were embodied as electromagnets, that the current therethrough could be regulated such that the magnetic field B1 within the generator duct 38 could be made greater than that field B2 directed through the pump duct 36. Depending on other system parameters, it is possible that by varying one or both of the duct heights t1 and t2 and the magnetic flux densities B1 and B2 will cause high-efficiency operation with the flow rate within the pump duct 36 greater than the flow rate through the generator duct 38.

In a second mode of operation, the regulating EM flow coupler 10 may be operated as a pressure amplifier, whereby the pressure rise of the fluid within the pump duct 14 is made greater than the pressure drop of the fluid within the generator duct 38. In particular, the duct height t1 of the generator duct 38 is made greater than the duct height t2 of the pump duct 36, or the flux density B2 within the pump duct 36 is made greater than the flux density B1 within the generator duct 38.

These operating conditions as required for operating the regulating EM flow coupler 10 as a pressure amplifier are exactly opposite to design considerations for operation as a flow rate amplifier. It is impossible to have both flow and pressure amplification in the same design. This is because the efficiency of one mode is defined as the product of flow amplification and pressure amplification factors, as will be discussed below. As will be demonstrated later, that the ratio $(B_2/B_1)/(t_2/t_1)$ must be made sufficiently greater than unity in order that the pressure ratio is greater than unity, i.e., pressure amplification is achieved. In a similar fashion, if the ratio $(t_2/t_1)/(B_2/B_1)$ is made sufficiently great, the flow rate ratio is made greater than 1, i.e., flow rate amplification is achieved.

A simple analysis of the flow coupler was presented in the above referenced Pulley patent assuming one-dimensional magnetic field, current and flow and no fringing of current or field outside of the center region of the EM flow coupler. The equations for flow rate and pressure drop through the generator duct can be written in matrix form as follows:

$$\begin{bmatrix} \Delta P_1 \\ Q_1 \end{bmatrix} = \begin{bmatrix} B_1/t_1 & 0 \\ 0 & t_1/B_1 \end{bmatrix} \begin{bmatrix} I_1 \\ E_1 \end{bmatrix} \quad (1)$$

where B1 is the magnetic flux density in generator, t1 is the duct height, I1 is the duct current, E1 is the voltage developed across the generator duct, ΔP1 is the pressure drop along the generator duct 38, and Q1 is the flow rate of the metal circulated through the generator duct 38. Similarly, the equations for flow rate and pressure rise through the pump duct 36 can be written:

$$\begin{bmatrix} \Delta P_2 \\ Q_2 \end{bmatrix} = \begin{bmatrix} B_2/t_2 & 0 \\ 0 & t_2/B_2 \end{bmatrix} \begin{bmatrix} I_2 \\ E_2 \end{bmatrix} \quad (2)$$

Here, the subscript 2 refers to the parameters relating to the pump duct 36.

Figure 3:
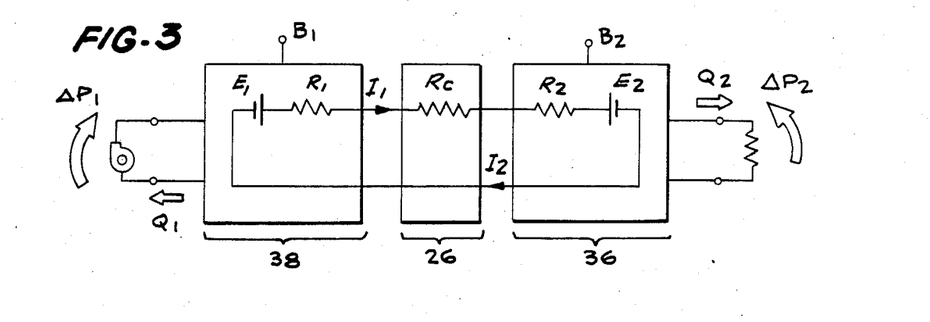
FIG. 3 is a schematic diagram of the equivalent, electrical circuit of the regulating flow coupler of this invention acting as a flow/pressure amplifier.

FIG. 3 is an electrical, equivalent circuit of the distributed system as comprising the generator duct 38, the pump duct 36, and the bus bar or electrically conductive divider plate 26 disposed therebetween. The electrical elements as indicated in FIG. 3 are defined as follows. R1 is the ohmic resistance of the fluid directed through the generator duct 38 within the magnetic field B1. R2 is the ohmic resistance of the fluid directed through the pump duct 36 within the magnetic field B2. Rc is the total resistance in the paths 48 and 50 from the generator duct 38 to the pump duct 36, which includes the ohmic resistances of the divider plate 26 and the walls 14, 16, 18, 20, 22, and 24, and the interfacial resistance presented between the liquid metal and the exposed surfaces of those inner ducts 52 and 54 overlying the side walls 14 and 24 and the divider plate 26. The relationship between the currents and voltages presented in the generator duct 38 and the pump duct 36 is expressed follows:

$$\begin{bmatrix} I_1 \\ E_1 \end{bmatrix} = \begin{bmatrix} 1 & 0 \\ -[R_1 + R_2 + R_c] & -1 \end{bmatrix} \begin{bmatrix} I_2 \\ E_2 \end{bmatrix} \quad (3)$$

The relationship between the flow rate Q1 and the pressure ΔP1 of the liquid metal circulated through the generator duct 38 and the flow rate Q2 and pressure rise ΔP2 of the liquid metal pumped through the pump duct 36 is derived by rearranging equations (1) and (2) to obtain expressions for I1 and E1 and I2 and E2, which are substituted into equation (3). Subsequent matrix conversion and multiplication of equation (3) provides:

$$\begin{bmatrix} \Delta P_1 \\ Q_1 \end{bmatrix} = \begin{bmatrix} \dfrac{B_1/t_1}{B_2/t_2} & 0 \\ \dfrac{-[R_1 + R_2 + R_c]}{\dfrac{B_1}{t_1} \cdot \dfrac{B_2}{t_2}} & -\dfrac{B_2/t_2}{B_1/t_1} \end{bmatrix} \begin{bmatrix} \Delta P_2 \\ Q_2 \end{bmatrix} \quad (4)$$

Such an EM flow coupler 10, wherein the liquid metals flow in opposite directions as indicated by arrows 46 and 47, is known as an anti-parallel flow coupler.

The second equation of the matrix expression (4) can be divided by Q1 and the following expression of the ratio of the flow rates obtained:

$$\dfrac{-Q_2}{Q_1} = \dfrac{t_2/t_1}{B_2/B_1} \cdot \quad (5)$$

$$\left[ \dfrac{1}{1 + \left(\dfrac{\Delta P_2}{Q_2}\right)\left(\dfrac{t_2}{B_2}\right)^2 (R_1 + R_2 + R_c)} \right]$$

The opposite signs are provided on Q1 and Q2 as a matter of mathematical notation to indicate power flow out of a duct as positive and power flow into a duct as negative. It is clear, then, that $(t_2/t_1)/(B_2/B_1)$ must be made sufficiently greater than the reciprocal of the bracketed term of expression (5) in order to ensure that the flow ratio is greater than one to achieve flow amplification. Qualitatively speaking, the pump duct height t2, as shown in FIG. 1, must be sufficiently greater than the generator duct height t1 and/or the pump flux density B2 must be sufficiently less than the generator flux density B1, as stated earlier.

The expression for pressure ratio can also be $$\dfrac{\Delta P_2}{\Delta P_1} = \dfrac{B_2/t_2}{B_1/t_1} \text{ or } \dfrac{\Delta P_2}{\Delta P_1} = \dfrac{(B_2/B_1)}{(t_2/t_1)} \quad (6)$$

It is now the case that $(B_2/B_1)/(t_2/t_1)$ must be made sufficiently greater than unity in order to make the ratio of the pressures differentials greater than unity to achieve pressure amplification. This is evidence that the flow ratio and pressure ratio are inversely proportional to one another.

The expression for hydraulic efficiency $\eta$ of the flow coupler 10 is defined as the flow power output of the pump duct 36 over the flow power input to the generator duct 38:

$$\eta = -\dfrac{\Delta P_2 Q_2}{\Delta P_1 Q_1}, \quad (7)$$

with the minus sign included to make $\eta$ positive. Substituting the relationship (6) between $\Delta P_1$ and $\Delta P_2$ into equation (7), provides:

$$\eta = \left(\dfrac{B_2}{B_1}\right)\left(\dfrac{t_1}{t_2}\right)\left(\dfrac{-Q_2}{Q_1}\right). \quad (8)$$

Thus, it appears that the efficiency $\eta$ increases indefinitely as the flow ratio increases. However, this simple theory neglects end effects which, upon increase pump flow rate, would cause generator action to start in the pump duct 36. This would lower the net pressure rise in the pump duct 36 and, thus, the efficiency $\eta$. Thus, the efficiency $\eta$ must reach a maximum for some value of the flow ratio.

Numerical and analytical studies as reported in "A Quasi-One-Dimensional Analysis of an Electromagnetic Pump Including End Effects", in *Liquid Metal Flows and Magnetohydrodynamics*, Progress in Astronautics and Aeronautics, Vol. 84, AIAA, New York, 1983, by W. F. Hughes and I. R. McNab, have led to the development of a quasi-one-dimensional analysis of the DC EM pump that includes end effects. This theory was extended to the DC EM generator and, eventually, to the EM flow coupler in a report, "High Efficiency DC Electromagnetic Pumps and Flow Couplers for Pool-Type LMFBRs", in *Liquid Metal Flows and Magnetohydrodynamics*, Progress in Astronautics and Aeronautics, Vol. 84, AIAA, New York, 1983, by I. R. McNab and C. C. Alexion. Later, in experimental studies described in "Demonstration of Flow Couplers for the LMFBR", December 1983 by EPRI, R. D. Nathenson, et al., it was shown that the flow coupler theory accurately described the operation of a prototype flow coupler of the type shown in FIG. 1.

Figure 4:
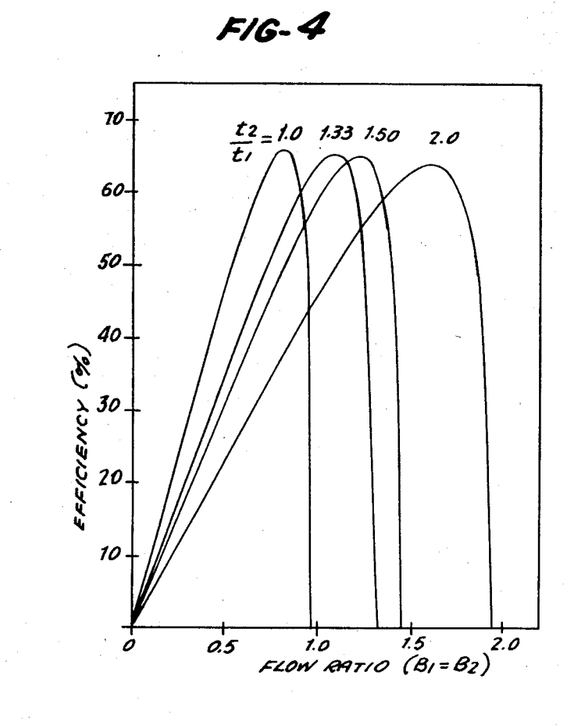
FIG. 4 is a graph illustrating the efficiency versus the ratio of flow rates or flow ratio through the ducts of an EM flow coupler for the case of equal flux densities in each duct.
Figure 5:
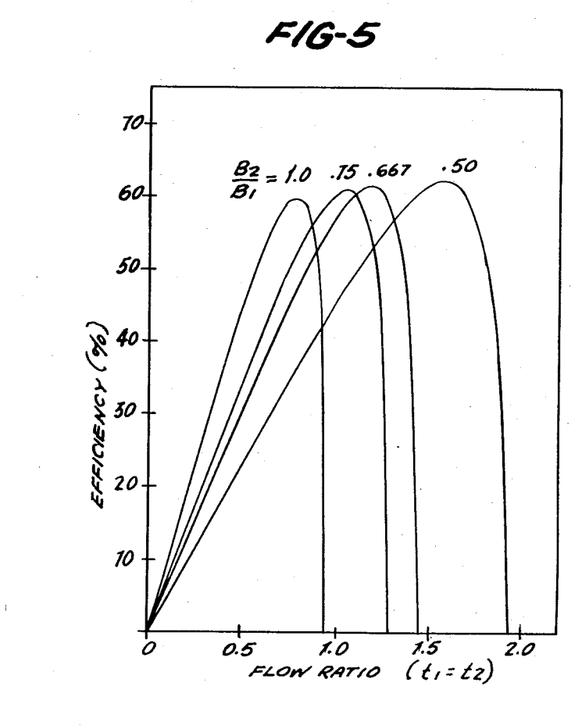
FIG. 5 is a graph illustrating the efficiency as a function of the ratios of flow rates in each of the ducts of a flow coupler where each duct is of the same height.

The quasi-one-dimensional analysis of the flow coupler will now be described for the case of a flow or pressure amplifier. Sample curves of efficiency $\eta$ as a function of flow rate Q have been generated for the sake of comparison. FIG. 4 shows how the height ratio (the generator duct t1 height over the pump duct height t2) affects the efficiency $\eta$ for the case of equal flux densities in the two ducts. It can be seen that increasing the height ratio increases the optimum flow ratio value, that is, the point where maximum efficiency is reached. It also has an overall effect of slightly decreasing the maximum efficiency $\eta$. FIG. 5 shows how the flux density ratio (B2/B1) affects the flow amplifier efficiency $\eta$ for the case of equal duct heights, $t1 = t2$. It can be seen that decreasing the flux density ratio increases the optimum flow ratio value, and it also increases the maximum efficiency $\eta$ as well.

Figure 6:
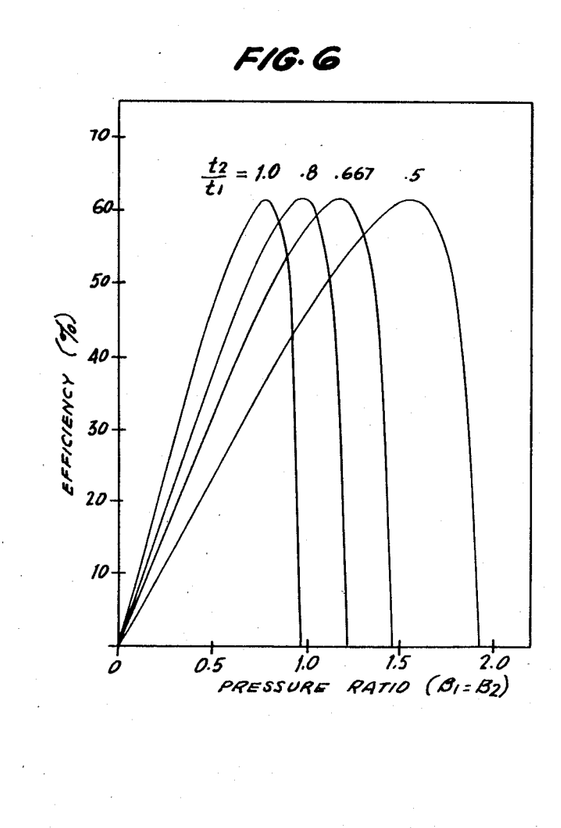
FIG. 6 is a curve indicating the efficiency as a function of the ratios of pressures where equal flux densities are established in the ducts of a flow coupler.
Figure 7:
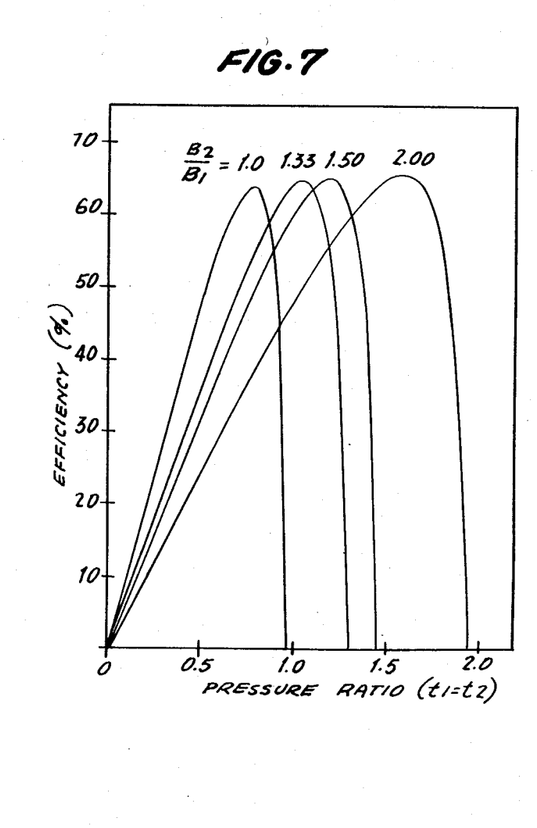
FIG. 7 is a curve of the efficiency as a function of the ratio of the pressures where the ducts of a flow coupler have equal duct heights.

The case of the pressure amplifier is presented graphically in FIGS. 6 and 7. The effect of height ratio t2/t1 is shown in FIG. 6, where the flux densities B1 and B2 have been equalized for clarity. It clearly shows that pressure amplification is only accomplished for $(t_2/t_1) < 1$. The effect of flux density ratio is shown in FIG. 7. Here, the height ratio was fixed at unity for simplicity. Overall, the efficiency $\eta$ increases slightly as the flux density ratio is increased, as shown in FIG. 7.

Figure 2:
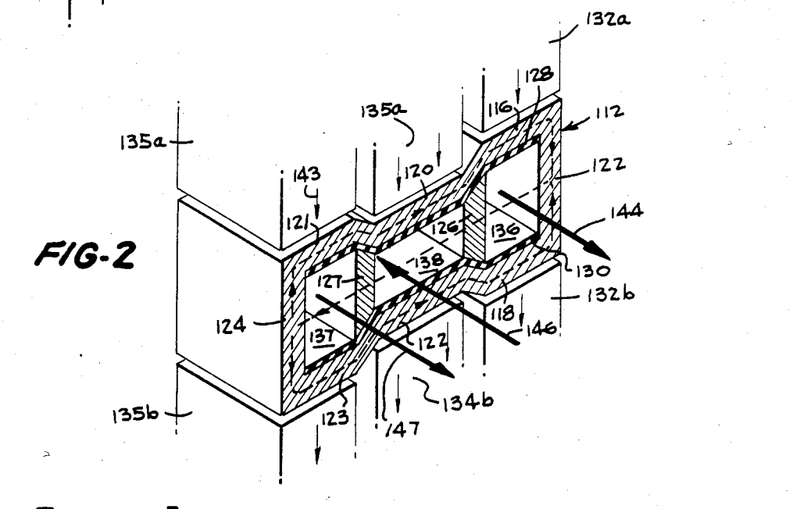
FIG. 2 is a broken away, perspective view of a further embodiment of this invention in which a second pump duct is associated with the generator duct.

Referring now to FIG. 2, there is shown a further embodiment of this invention, where elements similar to those in FIG. 1 are identified by similar numbers except numbered in the hundred series. FIG. 2 illustrates a regulating EM coupler 110 having more than one pump duct. In particular, the flow coupler 110 has a second flow duct 137 that is separated from a generator duct 138 by an electrically conductive divider plate 127. In addition, a magnetic field 133 is established by a third set of magnetic poles 135a and 135b that direct a magnetic flux in a vertical direction as indicated by arrows 143. In a further embodiment this invention, it is contemplated that there would be two generator ducts and a single pump duct. In the embodiment as shown in FIG. 2, it is contemplated that the metal fluids as driven through the pump ducts 136 and 137 are isolated from each other and may be different metals as driven along the paths indicated by the arrows 147 and 144, respectfully. Though not shown in FIG. 2, inner ducts may be disposed within each of the generator ducts 138 and the pump ducts 136 and 137 to protect against the corrosive attack of such metal liquids as sodium.

Figure 8:
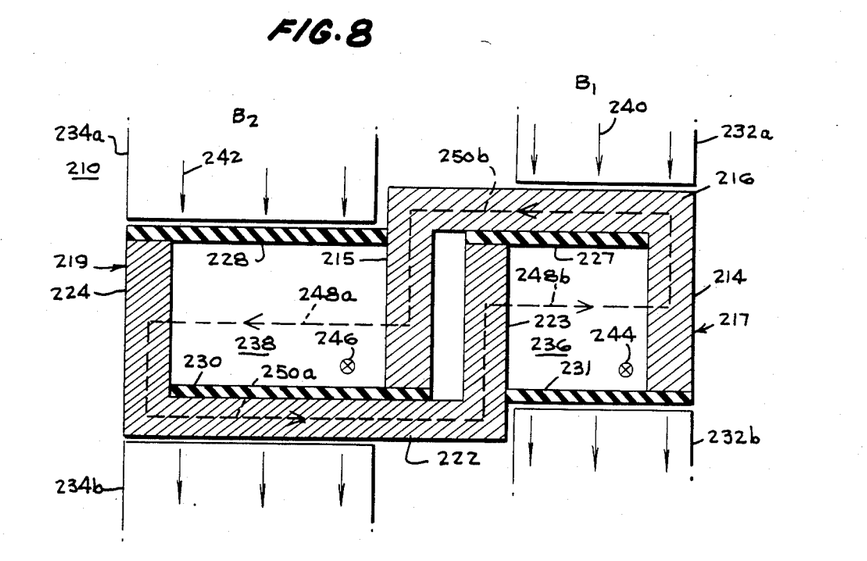
FIG. 8 is a side, sectioned view of a parallel flow coupler wherein the fluid flows in the pump and generator ducts are in the same direction.

Referring now to FIG. 8, there is shown a further embodiment of this invention, where elements similar to those in FIG. 1 are identified by similar numbers except numbered in the 200 series. In particular, FIG. 8 shows a parallel flow coupler 210 wherein the liquid metals in the pump duct 236 and the generator duct 238 flow in the same direction as indicated by the x's 246 and 244, i.e., into the page as seen in FIG. 8. The construction of the parallel flow coupler 210 differs from those of the embodiments of FIGS. 1 and 2 in that the parallel flow coupler 210 is comprised of a first U-shaped electrode 219 and a second U-shaped electrode 217. The generator duct 238 is formed by portions of the first and second electrodes 219 and 217 and, in particular, by the side wall 224 and the bottom wall 222 of the first electrode 219 and a side wall 215 of the second electrode 217. Insulating members 228 and 230 are disposed parallel to each other and extend from the side member 224 to the side member 215. In a similar fashion, the pump duct 236 is formed by the side wall 214 and the top wall 216 of the second electrode 217 and the side wall 223 of the first electrode 219. Insulating members 231 and 227 extend parallel to each other from the side wall 223 to the side wall 214. A first magnetic field B1 as indicated by arrows 240 is directed through the pump duct 236. A second magnetic field B2 as indicated by the arrows 242 is directed through the generator duct 238, whereby a current is directed through the liquid flowing therethrough along a path indicated by the arrow 248a. The first U-shaped electrode 219 provides a return path as indicated by the arrow 250a to the pump duct 236, wherein the current flows across a path indicated by the numeral 248b. Similarly, the second U-shaped electrode 217 provides a return path 250b for the current to flow from the pump duct 236 to the generator duct 238. As seen in FIG. 8, the current flows in opposite directions along the paths 248a and 248b, whereas the liquid flows within the generator duct 238 and the pump duct 236 in the same direction. The flux densities B1 and B2, as well as the heights of the generator duct 238 and the pump duct 236, may be varied as explained above whereby the flow characteristics such as flow rate or pressure within the pump duct 236 may be controlled.

In considering this invention, it should be remembered that the provided disclosure is illustrative only and the scope of the invention should be determined by the appended claims.

We claim as our invention:

1. A flow characteristic regulating electromagnetic flow coupler comprising:
   (a) a pump duct and a generator duct for connection in separate flow circuits containing electrically conductive fluid;
   (b) circuit means for electrically connecting the separate fluid in each of said pump and generator ducts and for conducting electric current through the fluid in each of said pump and generator ducts transversely of the fluid flow therethrough;
   (c) means for applying respectively first and second magnetic fields through the fluid of said pump and generator ducts transversely of the current and fluid flow therethrough, whereby the fluid driven through said generator duct forces the fluid to flow through said pump duct; and
   (d) means for setting the flux density of the first and second magnetic fields in said generator and pump ducts at different levels B1 and B2 respectively, whereby the flow characteristic of the forced fluid in said pump duct is greater than that flow characteristic of the driven fluid in said generator duct.

2. The regulating electromagnetic flow coupler as claimed in claim 1, wherein said generator duct and said pump duct have respective heights t1 and t2 as taken along the directions of the magnetic fields directed through said generator and pump ducts.

3. The regulating electromagnetic flow coupler as claimed in claim 2, wherein the flow characteristic is pressure rise and said flow coupler is adapted to operate as a pressure amplifier, wherein the ratio $(B_2/B_1)/(t_2/t_1)$ is set sufficiently high such that the pressure rise of the fluid in said pump duct is greater than the pressure drop of the fluid in said generator duct.

4. The regulating electromagnetic flow coupler as claimed in claim 2, wherein the flow characteristic is flow rate and said flow coupler is adapted to operate as a flow rate amplifier, wherein the ratio $(t_2/t_1)/(B_2/B_1)$ is set sufficiently greater than 1 such that the flow rate of the fluid in said pump duct is greater than the flow rate of the fluid in said generator duct.

5. The regulating electromagnetic flow coupler as claimed in claim 2, wherein the flow characteristic is flow rate and said flow coupler is adapted to operate as a flow rate amplifier, said duct height t2 is greater than said duct height t1 and said setting means sets the flux density B1 of said first magnetic field greater than the flux density B2 of said second magnetic field, whereby the flow rate of the fluid in the said pump duct is greater than the flow rate of the fluid in said generator duct.

6. The regulating electromagnetic flow coupler as claimed in claim 5, wherein said pump duct is disposed adjacent said generator duct.

7. The regulating electromagnetic flow coupler as claimed in claim 6, wherein there is included a divider plate made of an electrically conductive material and disposed as a common wall between said generator and pump ducts.

8. The regulating electromagnetic flow coupler as claimed in claim 7, wherein said magnetic field applying means comprises first and second sets of magnetic poles for respectively applying said first and second magnetic fields of flux densities B1 and B2, said setting means comprising means for providing first and second air gaps respectively between said first and second sets of magnetic poles, said second air gap being of a greater length than said first air gap.

9. The regulating electromagnetic flow coupler as claimed in claim 2, wherein the flow characteristic is fluid pressure rise and said flow coupler is adapted to operate as a pressure amplifier, said duct height t1 being made greater than said duct height t2, and said setting means setting said flux density B2 of said second magnetic field greater than said flux density B1 of said first magnetic field.

10. The regulating electromagnetic flow coupler as claimed in claim 9, wherein said pump duct is disposed adjacent said generator duct.

11. The regulating electromagnetic flow coupler as claimed in claim 10, wherein there is included a divider plate made of an electrically conductive material and disposed as a common wall between said pump duct and said generator duct.

12. The regulating electromagnetic flow coupler as claimed in claim 11, wherein said magnetic field applying means comprises first and second sets of magnetic poles for providing respectively said first and second magnetic fields of flux densities B1 and B2, said flux density setting means comprising means for providing first and second air gaps respectively between said magnetic poles of said first and second sets, said second air gap being set larger than said first air gap.

13. The regulating electromagnetic flow coupler as claimed in claim 1, wherein there is further included a second pump duct for connection in a separate fluid circuit containing electrically conductive fluid.

14. The regulating electromagnetic flow coupler as claimed in claim 13, wherein said generator duct is disposed in a side-by-side relationship between said first-mentioned and said second pump ducts.

15. The regulating electromagnetic flow coupler as claimed in claim 14, wherein there is included first and second divider plates each made of an electrically conductive material and disposed respectively as a common wall between said generator duct and said first-mentioned pump duct and said generator duct and said second pump duct.

16. The regulating electromagnetic flow coupler as claimed in claim 1, wherein there is included a second generator duct.

17. The regulating electromagnetic flow coupler as claimed in claim 16, wherein said pump duct is disposed in a side-by-side relationship with each of said first-mentioned and second generator ducts.

18. The regulating electromagnetic flow coupler as claimed in claim 17, wherein there is included first and second divider plates each made of an electrically conductive material, said first-mentioned and said second divider plates being disposed respectively as a common wall between said first-mentioned generator duct and said pump duct and between said pump duct and said second generator duct.

19. The regulating electromagnetic flow coupler as claimed in claim 1, wherein said pump duct is disposed adjacent said generator duct, and said circuit means comprises a divider plate made of an electrically conductive material and disposed as a common wall between said generator and pump ducts.

20. The regulating electromagnetic flow coupler as claimed in claim 19, wherein said applying means applies said first and second magnetic fields in a first direction through said generator and pump ducts, whereby current is generated along a path extending through said pump duct, said divider plate and said generator duct and the fluid in said pump duct is driven in a direction opposite to that of the fluid flow through said generator duct.

21. The regulating electromagnetic flow coupler as claimed in claim 1, wherein said circuit means electrically connects the fluid in each of said pump and generator ducts such that electric current flows along a first current path in a first direction through the fluid in said generator duct and along a second current path in a second direction through said pump duct, said first direction being opposite to said second direction.

22. The regulating electromagnetic flow coupler as claimed in claim 21, wherein said applying means applies each of said first and second magnetic fields in a third direction through said generator and pump ducts, whereby the fluid in each of said pump and generator ducts is driven in a common direction.

23. The regulating electromagnetic flow coupler as claimed in claim 22, wherein said pump and generator ducts are disposed adjacent of each other and said first current path extends from a first point through said generator duct to a second point and said second current path extends from a third point through said pump duct to a fourth point, and said circuit means comprises first conductor means for providing a third current path for current flow from said second point to said third point, second conductor means for providing a fourth current path for current flow from said fourth point to said first point and means for electrically isolating said third and fourth current paths from each other.

24. The regulating electromagnetic flow coupler as claimed in claim 23, wherein said first and second conductor means comprise respectively first and second U-shaped, electrically conductive members each having first and second leg portions and a bite portion extending therebetween, said first leg and said bite portions of said first conductive member and said second leg portion of said second conductive member forming respectively three sides of said generator pump, said second leg portion of said first U-shaped member and said bite portion and said first leg portion of said second U-shaped member forming respectively three sides of said pump duct.

25. A flow rate regulating electromagnetic flow coupler comprising:
(a) a pump duct and a generator duct for connection in separate flow circuits containing electrically conductive fluid, said generator duct and said pump duct have respectively heights t1 and t2 as taken along the directions of the magnetic fields directed through said pump and generator ducts, said pump duct is disposed adjacent said generator duct;
(b) a divider plate made of an electrically conductive material and disposed as a common wall between said generator and pump ducts;
(c) circuit means for electrically connecting the separate fluid in each of said pump and generator ducts for conducting electric current through the fluid in each of said pump and generator ducts transversely of the fluid flow therethrough;
(d) means for applying respectively first and second magnetic fields through the fluid of said pump and generator ducts transversely of the current and fluid flow therethrough, whereby the fluid driven through said generator duct forces the fluid to flow through the said pump duct;
(e) means for setting the flux density of said first and second magnetic fields in said generator and pump ducts at different levels B1 and B2 respectively, whereby the flow rate of the forced fluid in said pump duct is greater than the flow rate of the driven fluid in said generator duct; and
(f) said duct height t2 is greater than said duct height t1, said setting means sets said flux density B1 of said first magnetic field greater than said magnetic flux density B2 of said second magnetic field, said magnetic field applying means comprising first and second sets of magnetic poles for respectively applying said first and second magnetic fields of flux densities B1 and B2, said flux density setting means comprising means for providing first and second air gaps respectively between said first and second sets of magnetic poles, said second air gap being of a greater length than said first air gap, whereby the flow rate of the fluid in the said pump duct is greater than the flow rate of the fluid in said generator duct.

* * * * *